United States Patent [19]
Remensperger

[11] Patent Number: 5,949,858
[45] Date of Patent: Sep. 7, 1999

[54] TELEPHONE NETWORK EMULATOR USEFUL IN ADAPTING A FACSIMILE DEVICE TO OPERATE AS A SCANNER OR PRINTER

[76] Inventor: Donald E. Remensperger, 4948 Cartwright Ave., North Hollywood, Calif. 91601

[21] Appl. No.: 08/870,576

[22] Filed: Jun. 6, 1997

[51] Int. Cl.[6] .................................................. H04M 11/00
[52] U.S. Cl. .............................. 379/100.01; 379/100.15; 358/442
[58] Field of Search .............................. 379/93.05, 93.06, 379/93.07, 93.09, 93.26, 93.28, 100.01, 100.02, 100.12, 100.13, 100.14, 100.15, 100.17; 358/400, 407, 434, 440, 442, 468

[56] References Cited

U.S. PATENT DOCUMENTS

| | | | |
|---|---|---|---|
| 4,964,154 | 10/1990 | Shimotono | 379/100.15 |
| 4,991,200 | 2/1991 | Lin | 379/100.15 |
| 5,528,385 | 6/1996 | Manning | 358/442 |
| 5,530,558 | 6/1996 | Nachman | 358/442 |
| 5,588,047 | 12/1996 | Rosengren et al. | 379/93.14 |

*Primary Examiner*—Paul Loomis
*Assistant Examiner*—Melur Ramakrishnaiah

[57] ABSTRACT

An emulation circuit for emulating the signals, impedances and decoding functions of a telephone network provides a substitute direct connection between a computer and a local facsimile device. The facsimile device can then be used as a printer or scanner, depending on the direction of transmission. The touch tone dialing sequence decoding is simplified in the circuit to a single bandpass filter stage which passes only a dual tone combination corresponding to a single numerical digit and it is this number that is entered as the last digit of the automatic dialing sequence. In this manner the functions of the computer or the fax are not disturbed and the last digit then enables a ring signal. On circuit completion, the line signal may be suppressed for a period corresponding to the transmission period of the header.

8 Claims, 4 Drawing Sheets

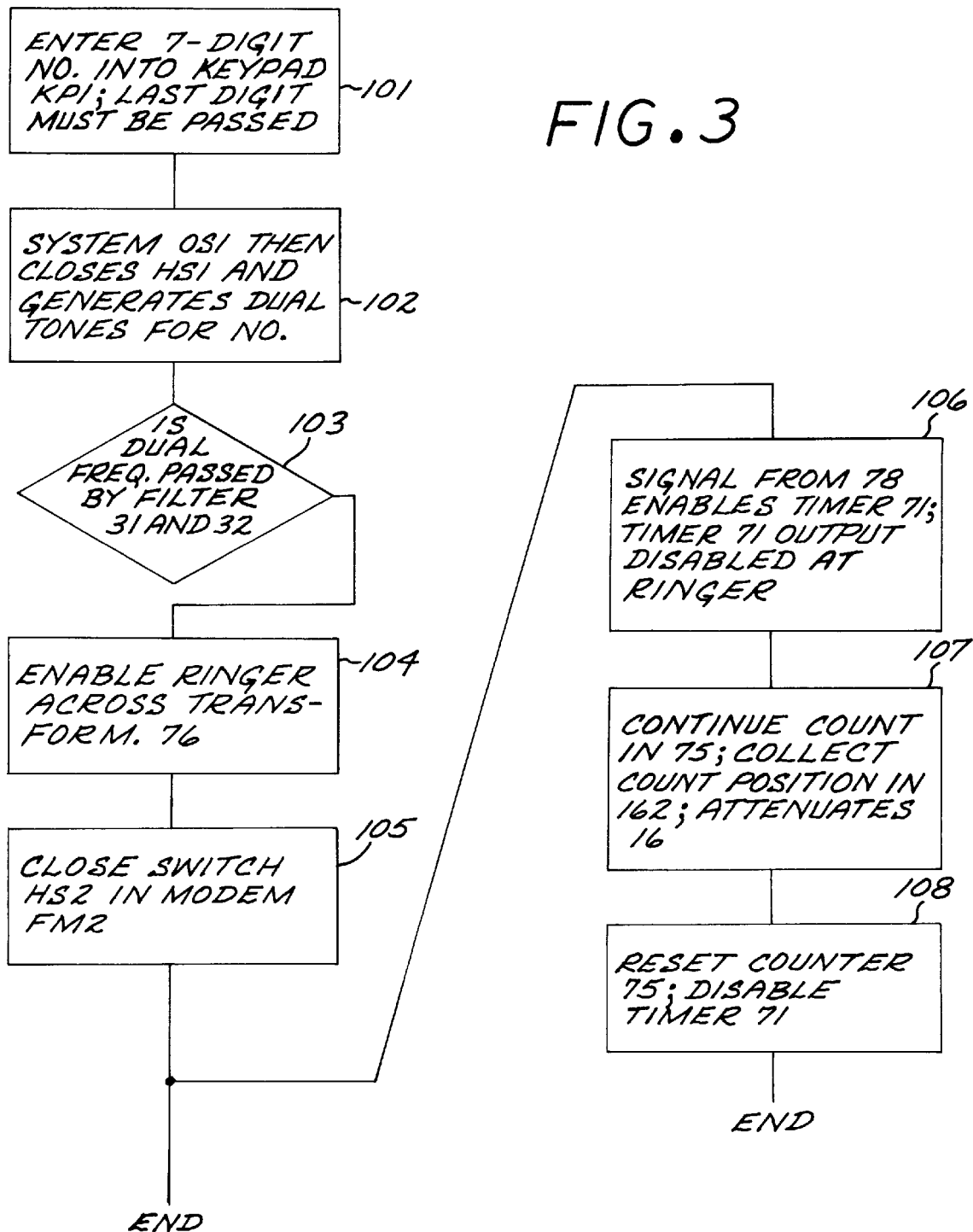

TELEPHONE NETWORK EMULATOR USEFUL IN ADAPTING A FACSIMILE DEVICE TO OPERATE AS A SCANNER OR PRINTER

BACKGROUND OF THE INVENTION

1. Field of the Invention

The present invention relates to data communication devices, and more particularly to portable connection circuits emulating a telephone network for conforming a facsimile device into a local printer or scanner.

2. Description of the Prior Art

The current development explosion in solid state technology, particularly in the processing rate and density of a microprocessor, along with parallel advances in memory devices, have now resulted in data processing systems that are fully compatible with a user. Simply, the evolution of these fundamental components is now at a capacity sufficient to handle high quality operating systems, and the resulting combination is now wholly 'user friendly' in all its domesticated forms. Laptop computers, palm-sized computers, and those even smaller are therefore now part of the landscape.

While the processing facility is now reaching the acceptance (and dimensions) of a pocket calculator, the physical dimensions of printing still limit the portability aspects of word processing systems.

Coincidentally, however, a concurrent evolution occurred in telephone transmission of image facsimilies. A facsimile device, with its print mechanism, is now part of any office, hotel facility, or other commercial establishment, and is proliferating with increasing frequency even in homes. The print mechanisms of a facsimile device are therefore now widely distributed in their various forms.

Telephonic transmission of images is constrained to the bandwidth of the telephone network, and the cost of transmission is a significant component of the design and selection of the device. As result the many compromises between print fidelity, the cost of telephone time and device complexity have evolved various commercial forms, and a wide variety of facsimile devices are now in the marketplace.

Each facsimile device, however, is physically limited, or fixed, by the limitations of the telephone network to a standardized communication format and therefore includes extensive logic in its operating system to determine the characteristics of the connecting device. Thus elaborate 'handshake' protocols are exchanged at the start of transmission which are then automatically processed as a part of the operating system through a communication interface with the telephone network, referred to as the modulator/demodulator (modem). As the evolution in data processing progressed, the function of this operating system that is tied to the modem has expanded, and now includes automatic dialing and other functions that remove and isolate the user from the mechanics of telephone line connection. Simply, to the user these functions are now virtually invisible, and a 'user-friendly' device only asks of the user to key in the destination telephone number and takes over from there.

The same user friendly aspects are now installed in the fax-modem of the computer. Thus little external control is available at both ends of a computer-facsimile combination over the TIP and RING functions of the telephone network. Like described above, the computer, provided with a fax-modem, automatically dials (and sometime re-dials) the destination number, discerns the line connection and generates and inspects the respective handshake signals, all without any participation by the user. As these 'user friendly' features of the system increase, less and less flexibility is available over this interconnection. Simply, the operating system controlling both modem interfaces is directed to the functions of a telephone network, and any mechanism for direct connection is best effected by emulation thereof.

In the past various techniques have been devised which allow for local connection of a facsimile device to a processor, to effect the functions of a printer. Examples of such techniques may be found in U.S. Pat. Nos. 5,530,558 to Nachman; 4,991,200 to Lin; and 5,528,385 to Manning. While suitable for the purposes intended, each of the foregoing impose on the user steps of manual intervention which are often improperly effected and more recently not compatible with the automatic dialing imbedded in current 'user-friendly' systems.

Commercial devices, like those sold under the Model No. DLE-200B by VIKING ELECTRONICS, INC., Hudson, Wis., similarly require selective articulation of manual switches, like the START switch on the facsimile assembly, along with operational modes that omit the dialing sequence. At the other extreme commercial devices, like those sold under the mark or style MISSING LINK, by BROTHER INTERNATIONAL CORP., Somerset, N.J., attempt to resolve the above problem by logical sequences, but in a manner requiring multi-pin connection ports, high processing rates, and high capacity storage. Thus, while suitable for the purposes intended, the commercially available devices fail to address the simplified user involvement in current data processing tasks, in an assembly that is both reliable and inexpensive in manufacture. A simple and inexpensive interconnection system that passively emulates the dialing responses of a telephone network is therefore desired and it is one such system that is disclosed herein.

SUMMARY OF THE INVENTION

Accordingly, it is the general purpose and object of the present invention to provide a portable connection circuit conformed to emulate a telephone network between a processor and a facsimile device.

Other objects of the invention are to provide a connection network useful in transforming a facsimile device into a printer.

Yet further objects of the invention are to provide an inexpensive portable circuit for substitution in stead of a telephone network.

Briefly, these and other objects are accomplished within the present invention by way of an interface provided with telephone line connectors at the circuit ends thereof, and conformed to emulate a telephone network therebetween. The interface is provided with a power source, a dialing code sequence detection stage, and a ringer circuit of at least one standardized ringing power unit [REN] at one of the standard ringer frequencies of 20+/_3 Hz or 30+/_3 Hz. In this form the interface effectively emulates the functions of a telephone network, and the impedance, voltage and current levels thereof are selected to approximate those of a telephone line.

The interface can then be connected in substitution for the telephone network between a computer and a facsimile device. Once thus connected the automated dialing functions of the system associated with the modem in the facsimile device, or the fax/modem in the computer, initiates the transmission of a number string, as if the number was sent into a telephone network. At the completion of the dialing sequence the ringer circuit is enabled for detection by the receiving device.

The receiving device then responds in its normal manner, producing a reduction in impedance across the TIP and RING lines known as the off-hook state. This change in impedance is used to disable the ringing circuit and is also detected at the sending device to initiate the transmission sequence, first preceded by the above-mentioned 'handshake' signal exchange. A timer may then be used for suppressing the header transmission of the facsimile signal. In this form the interface provides a local connection between a computer and a facsimile device, allowing the use of the facsimile as a printer or scanner.

Those skilled in the art will appreciate that the conventional telephone system utilizes dual tone coded signals for the telephone number transmission into the network. A precise decoding arrangement is thus necessary within the telephone network to select the various network branches, or exchanges, and thereafter the destination circuit itself and the automatic dialing functions are selected to meet the requirements of this decoding.

This precision of proper telephone destination decoding is not a dominant concern in a dedicated line. For the purposes of emulation such elaborate decoding is not required, and is included in the present invention in a simplified form, solely to accomodate the numerical sequence of the automated dialing process. The present invention utilizes the last digit of a sequence as the only digit tone combination detected by a pair of band-pass filters which, on detection, enable the ringer. In this manner all the timing aperture rigor of a tone code detection sequence is avoided, while at the same time allowing for automated dialing input.

The telephone number sequence that is then entered into the auto dial system may be any number, but will include the numerical digit corresponding to the two tone code combination as its last digit. Thus other than the last digit any sequence of different codes will not be passed by the filter pair. The ring signal is then generated within the interface to trigger the facsimile device to receive, a response detected once again by the off-hook detector which can then be used to set a timing aperture to suppress the signal for a selected period of time.

Thus by way of multiple use of a simple components and a timer the interface fully duplicates the functions of a telephone network while at the same time suppressing the signal during the period of time in which the header information is passed. By substituting this interface instead of the telephone network a direct path is established to effect the use of the facsimile device as a printer, or in the opposite direction as a scanner. Of course, known optical character recognition routines, and data compression may be included in the operating system to aid in the manipulation and compression of the scanned data.

Those skilled in the art will note that the foregoing structure fully duplicates the telephone network, and the operation of the facsimile is thus fully automatic. Thus no special intervention by the user is required other than the substituting connection of the interface. Moreover, multiple use of a tone band filters, timer, and signal generators reduces the cost of the assembly while also simplifying the task. In this manner a portable connection interface is devised which fully conforms any conventional facsimile device into a printer or a scanner.

BRIEF DESCRIPTION OF THE DRAWINGS

FIG. 3 is a functional sequence diagram, or flow chart, illustrating the sequence of functions effected by the inventive interface shown in FIG. 1.

DESCRIPTION OF THE PREFERRED EMBODIMENT

Figure 1:
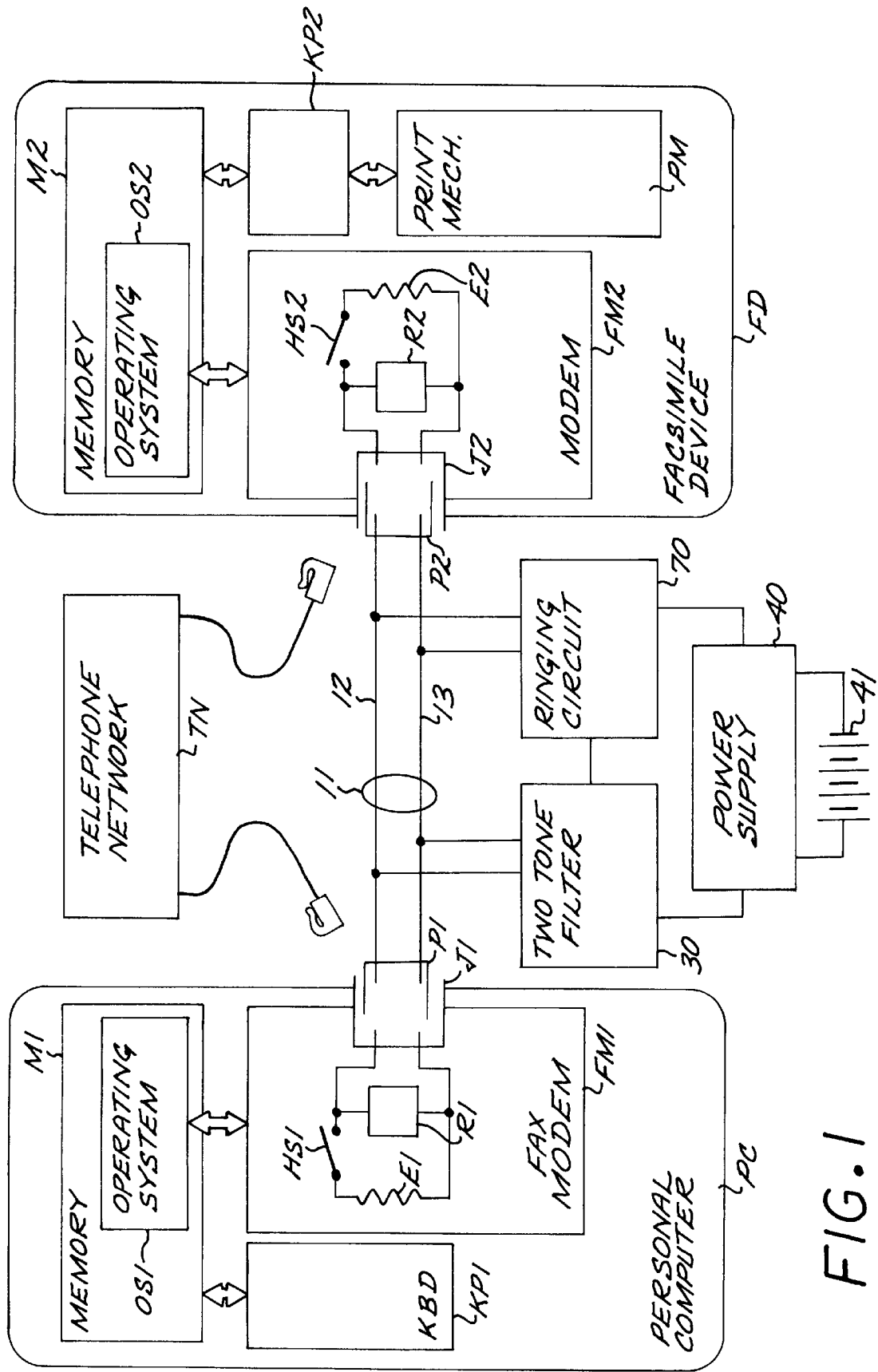
FIG. 1 is a block diagram illustration of the inventive interface connected between a data processor and a facsimile device, in substitution for a telephone network.

As shown in FIGS. 1–4a the inventive assembly, generally designated by the numeral 10, connects a telephone line 11 comprising leads 12 and 13 between a first fax/modem FM1 and a second modem FM2. In each instance the corresponding modem or fax/modem is an interface between the analog signal format of telephone transmission and the signal protocol of a facsimile image, and therefore both modems FM1 and FM2 replicate a conventional telephone instrument. Thus modems FM1 and FM2 are illustrated as each including a corresponding ringer R1 and R2, a hook switch HS1 and HS2, and the corresponding impedance E1 and E2. To further match the functions of a telephone instrument, each modem FM1 and FM2 is provided with a standard modular jack J1 and J2, each of conventional construction, and the ends of line 11 are similarly terminated in mating plugs P1 and P2. Depending on the number of lines available the plug and jack combinations may take the form of either the standard RJ11 or the RJ14 terminal configuration. In this form above the functional description is indistinguishable from the interconnection of a telephone network TN between two end instruments, and the line segment 11 is shown as a substituted connection for the network TN.

Similar conventional practices are effected on the other side of each modem interface. As illustrated herein, modem FM1 is a part of a personal computer PC while modem FM2 is tied to the facsimile device FD, but except as so shown their functions are indistinguishable. In both instances the particular modem FM1 or FM2 is duplicating a telephone instrument to the telephone network while also reconciling the limited bandwidth of the telephone signal with the extremely high switching rates of solid state devices within each device. Thus modem FM1 is shown as serviced by an operating system OS1 and similarly modem FM2 is served by an operating system OS2, each internal to the device and implemented in known manner. Operating systems OS1 and OS2 are imbedded in memories M1 and M2 and depending on the input through a key pad KP1 or KP2 effect the automatic dialing, and other functions like an automated response. The resulting functional equivalent in each modem, therefore, includes an off-hook state in circuit with lead 12, connecting the equivalent impedance E1 or E2 across the ringers R1 and R2. In this form modems FM1 and FM2 at the ends of line 11 duplicate the communicating telephone devices while the lead 11 emulates the telephone network itself. The emulation of the sending and the receiving device, however, is generally automatic, as controlled by the respective operating systems and little manual intervention is available in the current user-friendly implementations.

The transmission format of images between the devices, is a logical x-y dot image of a particular density, e.g., 200 by 200 pixels per inch, stored in the computer PC or the facsimile device FD, which in the latter instance then drives the print mechanism PM as the paper is advanced. It is the combination of image density and the print mechanics that then determine the fidelity of the print itself. Thus the transmission rate varies between the design compromises of facsimile devices, and this rate information is exchanged in the course of the handshake signal exchange.

All the above attributes of facsimile communication are utilized to advantage in the inventive assembly 10, by connecting across leads 12 and 13 a two tone filter stage 30, powered by a battery driven power supply 40 which, through a battery 41 powers a timer referenced ringing circuit 70. All the foregoing may be combined into a unitized assembly 25 along the line segment 11 which, at its ends, is terminated in the above referenced, conventional plugs. In this form, the ends of the line segment 11 may be inserted into the corresponding jacks of modems FM1 and FM2, in substitution for the telephone network connections. A direct, local connection between the computer PC and facsimile device FD is thus formed without any connection to the network TN.

The dialing sequence generated through either one of the connected modems is then inspected for a single tone combination by a low tone group band pass filter 31 in parallel with a high group band pass filter 32 respectively driving operational amplifier limiters 33 and 34. The outputs of amplifiers 33 and 34 are then collected at a NAND gate 35 driving a latch formed by NAND gates 36 and 37. By selecting a numerical code with a well defined frequency separation the above arrangement will produce a beat frequency condition that will switch gate 35, thus latching the circuit around gates 36 and 37. The latched signal from gate 36 may then be used to enable the ringing circuit 70.

Circuit 70 is conformed around a 555 timer 71, configured as an oscillator at 20 Hz by the r-c values of capacitor 72 and resistors 73. The oscialltor arrangement is enabled by the latched output of gate 36, and will therefore continue in oscillation as long as the latched signal subsists. The output of timer 71 is then brought out to a gate 74 and a counter 75, with the counter bit most closely approximating a two-second interval, at 20 cycles per second, utilized to gate switch 74 in circuit with the timer output signal. In this manner an oscillatory signal is passed in two-second intervals which is then used as the base signal to a transistor amplifier 77 tied to the primary of a transformer 76.

Transformer 76 is powered by the power supply 40 and will therefore develop the necessary signal levels at the secondary to drive the ringer R2 of the receiving device, e.g., approx. 80 volts rms. The conventional ringer response systems included in the receiving modem FM2 then close hook switch HS2, producing an impedance change sensed by an off-hook detector 78. The output of detector 78 is then fed to gate 37 to unlatch the ringer signal and to a gated driver 61 in circuit with the power supply 40. Thus once the receiving device responds, the circuit components of the network emulator are effectively disabled.

Those skilled in the art will note that a 'touch tone' dialing system is defined by a convention of dual frequency tones corresponding to each numerical digit. Thus, for example, the numerical digit "4" is defined as a combination of a 770 Hz tone and 1209 Hz tone; "7" is defined by 852 and 1209 Hz tones; and so on. Of the "0" to "9" digit set the widest frequency separation is in the "3" tone code, namely 697 and 1477 Hz, effectively a frequency ratio greater then 2. This frequency code convention may be used to advantage by entering into the operating system OS1 a numerical sequence like "777–7773" with the filters 31 and 32 set to pass the dual tones of 697 and 1477 Hz. A voltage divider 44 powered by the power supply 40 then provides a comparison or limiter reference to operational amplifiers 33 and 34 selected to form pulses to gate 35 that beat relative each other at the frequency difference, for a positive recognition.

Figure 2:
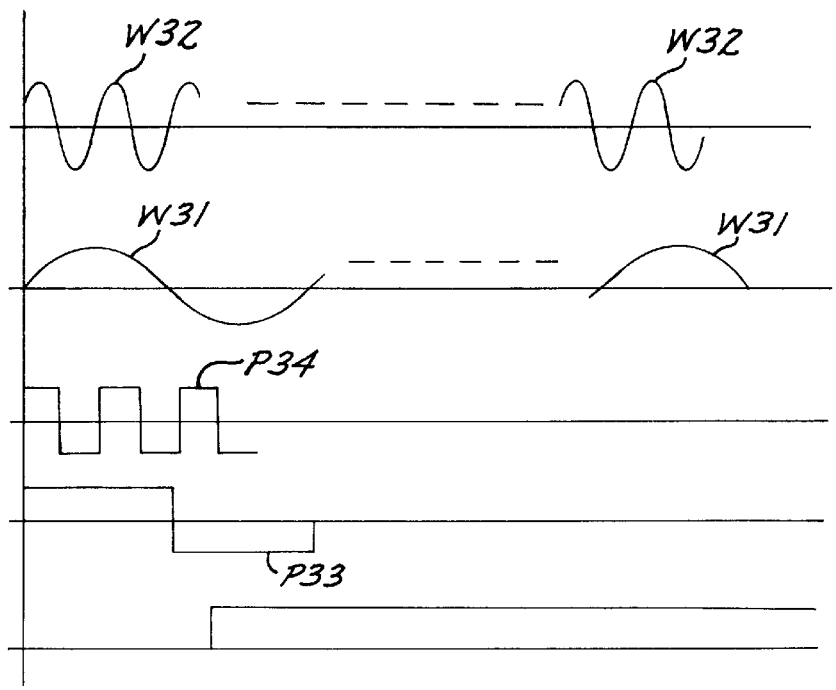
FIG. 2 is a pulse sequence useful with the invention herein.

More precisely, as shown in FIG. 2, the outputs of filters 31 and 32, shown as waveforms W31 and W32, are converted to pulse trains P33 and P34 at the output of amplifiers 33 and 34. Pulses P33 and P34, because of their uneven frequency ratio, will match up to switch gate 35 at least once in an interval of 0.012 seconds. The latching of the circuit around gates 36 and 37, shown as Q is therefore assured within the time intervals of automatic dialing. A dual tone code passed by the filters will therefore initiate the ringing sequence at Q, in a detection arrangement that does not require the recognition of the whole string of numders. Thus by the simple expedient of inserting as the last digit the tone frequencies of the filter pair the emulated detection task is grossly simplified.

Figure 4B:
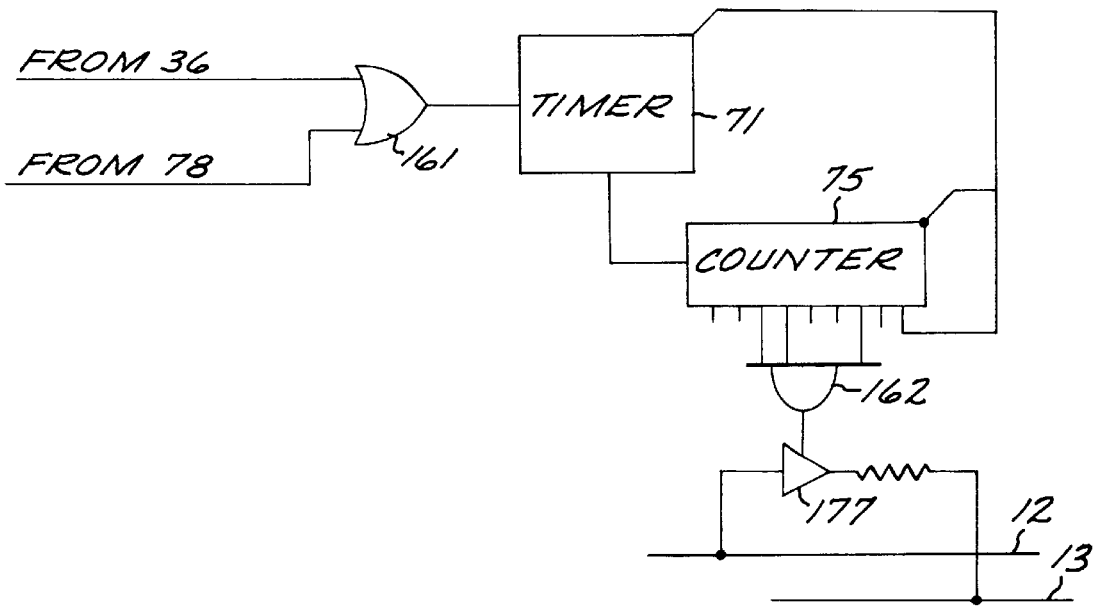
FIGS. 4a and b are each alternative circuit diagrams of of the inventive interface shown in FIG. 1.
Figure 4A:
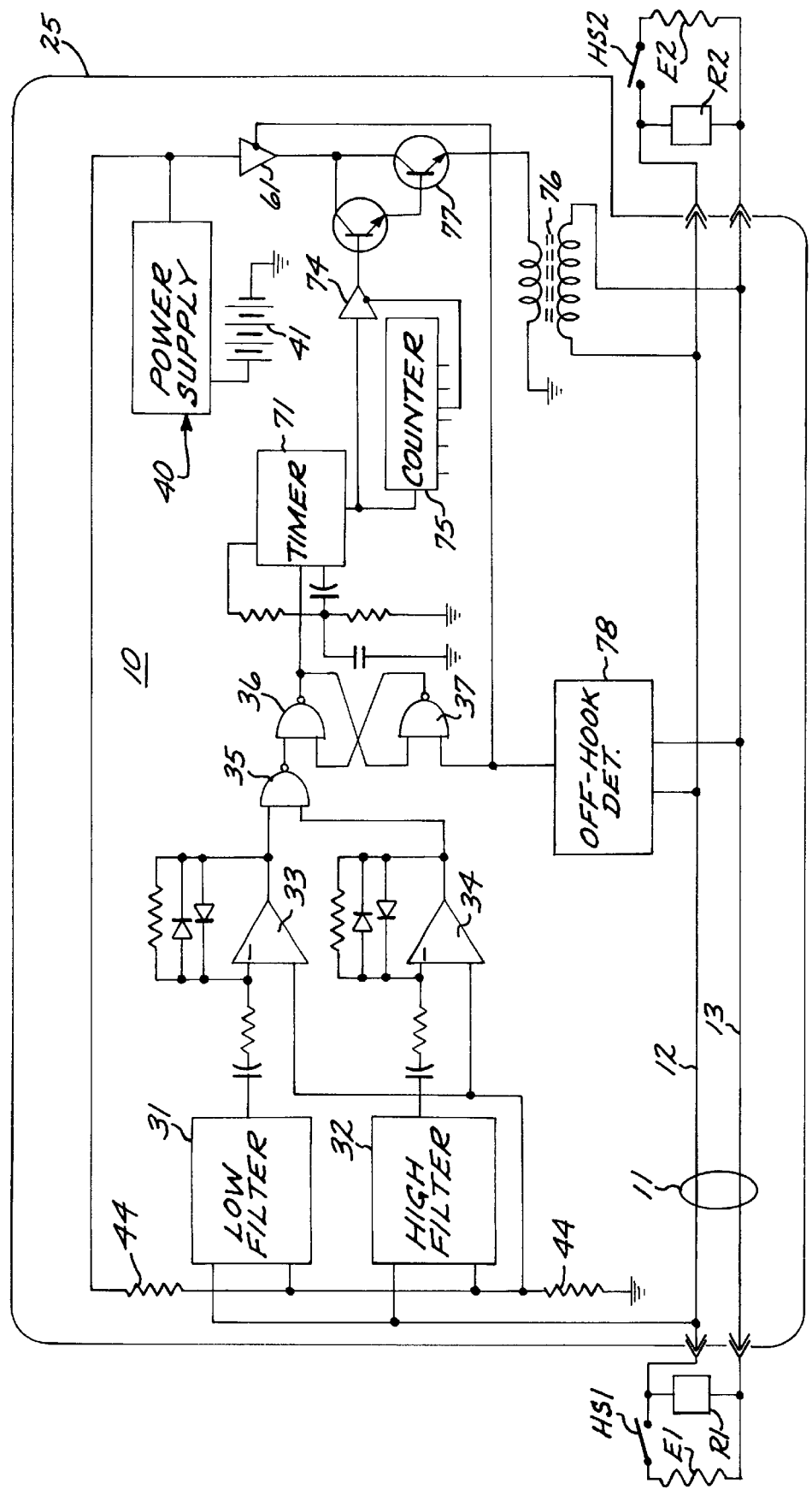

As shown in FIG. 4b, like numbered parts functioning in like manner, those instances where the facsimile transmission also includes a header message, an OR gate 161 may be inserted between gate 36 and the timer 71, receiving at its other input the signal from the off-hook detector 78. Selected other outputs of the counter 75 may then be collected at an AND gate 162 to form a timing aperture to an attenuator circuit 177 bridging lines 12 and 13. The highest count bit position of the counter 75 may then be returned to disable the timer and to reset the counter. Thus a timing aperture is formed, as defined by the count bits collected at gate 162, during which the signal across lines 12 and 13 is attenuated.

In this manner a logical interconnection sequence of a timer, based on the detected tone codes appearing across leads 12 and 13, first rings the receiving device and thereafter suppresses the header. Thus within a minimal complement of logical devices the telephone network is fully duplicated and is further modified to suppress the unwanted header transmission. The facsimile device FD is thus conformed as a printer.

By reference to FIG. 3 the operational sequence of the above described structure follows the flow chart wherein step 101 is the single manual entry step in which the selected printer 7-digit number, ending in the filtered digit, is manually entered into the device supported by fax/modem FM1. Thereafter in step 102 the modem sequence automatically lifts 'off hook', closing switch HS1, to the corresponding terminals of leads 12 and 13 and 'dials' the number sequence entered in dual tone code.

In step 103 the tones are inspected by bandpass, and if passed by filters 31 and 32, the timer 71 is latched in step 104 to a selected time pulse that is filtered and amplified in transformer 76 to the ringing voltage and frequency. This ringing emulates the conventional phone system, invoking in step 105 the automatic response of the other fax/modem FM2, at which point the circuit is completed. FM1 then emits the handshake signal and thereafter facsimile transmission is commenced.

In those instances where a header is automatically inscribed the structure shown in FIG. 4b provides an alternate path to timer 71 while at the same time disabling the ring signal, shown in step 106. In step 107 the count continues in counter 75, reaching the count aperture collected in gate 162 during which circuit 177 attenuates the line signal. Following this step the count is continued in step 108 to (i) reset the counter, and (ii) disble the timer.

Thus a minimal complement of parts, with its own power source, is rendered useful in sequantial use to fully emulate a passive telephone network. In this manner any computer provided with a fax/modem can be tied directly to a facsimile device to combine either into a printing function or a document reader by the sheer expedient of selection of the device that is directed to carry out step 101.

Obviously many variations and modifications can be effected without departing from the spirit of the invention described herein. It is therefore intended that the scope of the invention be determined solely by the claims appended hereto.

I claim:

1. A telephone network emulating system useful in connecting a plurality of dual tone code dialing instruments for transmitting images therebetween, comprising:

a paired signal line provided with connection devices at the ends thereof for connecting between a first and a second one of said instruments;

filter means operatively connected to said signal line and conformed to pass a predetermined dual tone combination of a tone code corresponding to a selected numerical digit;

latch means connected to said filter means and responsive to said tone code combination passed by said filter means for producing an enabling signal upon the receipt thereof;

a timer conformed to receive said enabling signal and for producing a sequence of pulse signals in response thereto;

a transformer connected to receive said pulse signals for transforming same into a ringer activating signal into said line; and counter means connected to receive said pulse signals and to said transformer, for enabling and disabling said transformer upon a selected alternate count of said pulse signals.

2. Apparatus according to claim 1, wherein:

said first instrument is a personal computer; and said second instrument is a facsimile device.

3. Apparatus according to claim 2, wherein:

said first instrument includes a memory and a modulator/demodulator connected to said line, said modulator/demodulator being conformed to produce a sequence of tone codes in response to a numerical sequence stored in said memory, said tone codes including a last one of said sequence at a frequency combination conformed to be passed by said filter means.

4. Apparatus according to claim 1, wherein:

said first and second instruments each include a modulator/demodulator connected to said line, said modulator/demodulator each being conformed to produce a sequence of tone codes including a last one of said sequence at a frequency combination conformed to be passed by said filter means.

5. Apparatus conformed to emulate a telephone network for connecting a personal computer provided with a first facsimile modulator/demodulator directly to a facsimile device provided with a second modulator/demodulator, said first and second modulators/demodulators each including an operating system for effecting automated dialing by way of a sequence of dual tone codes, comprising:

a paired signal line provided with connection devices at the ends thereof for connecting between said first and second ones of modulators/demodulators;

filter means operatively connected to said signal line and conformed to pass a predetermined dual tone combination of said tone codes corresponding to a selected numerical digit;

latch means connected to said filter means and responsive to said tone code combination passed by said filter means for producing an enabling signal upon the receipt thereof;

a timer conformed to receive said enabling signal and for producing a sequence of pulse signals in response thereto;

a transformer connected to receive said pulse signals for transforming same into a ringer activating signal into said line; and counter means connected to receive said pulse signals and to said transformer, for enabling and disabling said transformer upon a selected alternate count of said pulse signals.

6. Apparatus according to claim 5, further comprising:

time aperture means connected to said counter means for producing a disabling signal of a preselected duration; and attenuator means connected across said line and to said disabling signal for attenuating the signal on said line.

7. A method for connecting a computer to a facsimile device, comprising the steps of:

connecting a segment of a dual lead telephone line between said computer and said device;

bridging the leads of said line segment by a first and a second bandpass filter;

entering into said computer a sequence of numbers for conversion thereof into a sequence of dual tone codes impressed onto said line segment, the last one of said dual tone codes comprising frequencies at the passing bands of said first and second filters; and generating a ring signal onto said line segment upon the receipt of said dual tone code passed by said first and second filters.

8. A method according to claim 7 comprising the further step of:

suppressing all signals on said line segment for a preselected time interval.

* * * * *